United States Patent [19]

Nopper

[11] 4,181,961
[45] Jan. 1, 1980

[54] PROCESS FOR THE MEASUREMENT OF ABSOLUTE VALUES BY MEANS OF A NON-LINEARLY WORKING MEASURED VALUE EMITTER, AND A MEASURING DEVICE FOR CARRYING OUT THE PROCESS

[75] Inventor: Peter Nopper, Lyss, Switzerland

[73] Assignee: Zumbach Electronic AG, Orpund, Switzerland

[21] Appl. No.: 873,670

[22] Filed: Jan. 30, 1978

[30] Foreign Application Priority Data

Feb. 8, 1977 [CH] Switzerland .......................... 1480/77

[51] Int. Cl.² ........................ G06F 15/34; G01R 33/12
[52] U.S. Cl. .................................... 364/563; 324/229; 364/571
[58] Field of Search ............... 324/225, 228, 229, 230, 324/236, 237, 239; 364/563, 571, 573

[56] References Cited

U.S. PATENT DOCUMENTS

| | | | |
|---|---|---|---|
| 3,662,163 | 5/1972 | Miller et al. ..................... | 364/573 X |
| 3,757,208 | 9/1973 | Brunner ............................... | 324/230 |
| 3,790,910 | 2/1974 | McCormack ..................... | 364/573 X |
| 3,808,525 | 4/1974 | Ott ........................................ | 324/230 |
| 3,878,457 | 4/1975 | Rodgers .............................. | 324/229 |

*Primary Examiner*—Jerry Smith

[57] ABSTRACT

In a process for the measurement of absolute values by means of a non-linearly working measured value emitter, calibration of the measuring device is achieved by determining, for each of a range of measured values emitted, the corresponding absolute values, by means acting independently of the output signal of the measured value emitter, and storing each of the determined absolute values in a store at addresses defined by the measured value, and during a subsequent measuring process the store is interrogated by means of measured value information whereby the stored absolute values are determined. There is also described an apparatus for carrying out the process.

24 Claims, 4 Drawing Figures

PROCESS FOR THE MEASUREMENT OF ABSOLUTE VALUES BY MEANS OF A NON-LINEARLY WORKING MEASURED VALUE EMITTER, AND A MEASURING DEVICE FOR CARRYING OUT THE PROCESS

BACKGROUND OF THE INVENTION

The present invention relates to a process and a measuring apparatus for the measurement of absolute values by means of a non-linearly working measured value emitter. For example during the measurement of the layer thickness of an insulation on the conductor of a cable or the wall thickness of a pipe by means of a measuring coil of which the inductance is influenced by the conductor of the cable or a conductive reflector in the pipe and defines the frequency of a measuring oscillator, there exists no linear relation between the distance of the measuring coil from the conductor or the reflector and the frequency of the measuring oscillator. It is in these and similar cases difficult to carry out an absolute measurement without comparing during the measuring operation the determined measured value with the measured value of a corresponding measurement of a standard comparison object. The practical possibilities of such a comparison measuring process for the determination of absolute values are however very limited.

SUMMARY OF THE INVENTION

It is the object of the invention to make possible continuously an absolute measurement in a defined measuring region without simultaneous comparison measurement of a standard object. The process of the invention is characterized in that for a defined number of the said measured values coordinated absolute quantities or magnitudes are stored and during the measurement the absolute values stored in the addresses of the store corresponding to the determined measured values are readout. It is thus possible, after a single storage of measured value coordinated absolute quantities or magnitudes, to carry out all subsequent measurements in such a manner that from the momentarily determined measured values the stored absolute quantities or magnitudes can be determined. Preferably the storage is digital, in which case in modern stores very many absolute quantities or magnitudes can be stored as data, in such a way that measured value coordinated absolute quantities or magnitudes are storable in finer graduation and the power of resolution is considerable. It is also possible to make the graduation variable, that is during shallow development of the measured value alteration as a function of the alteration of the quantities or magnitudes to be determined the graduation can be larger than during steep development (FIG. 4).

The measuring apparatus in accordance with the invention is characterized by means for the registration of absolute measured values and a store for the storage of a number of these absolute measured values in addresses coordinated to corresponding measured magnitudes, and by means for the recovery from the store of the stored absolute quantities or magnitudes in accordance with the said measured quantities.

DETAILED DESCRIPTION OF THE PREFERRED EMBODIMENT

Figure 1:
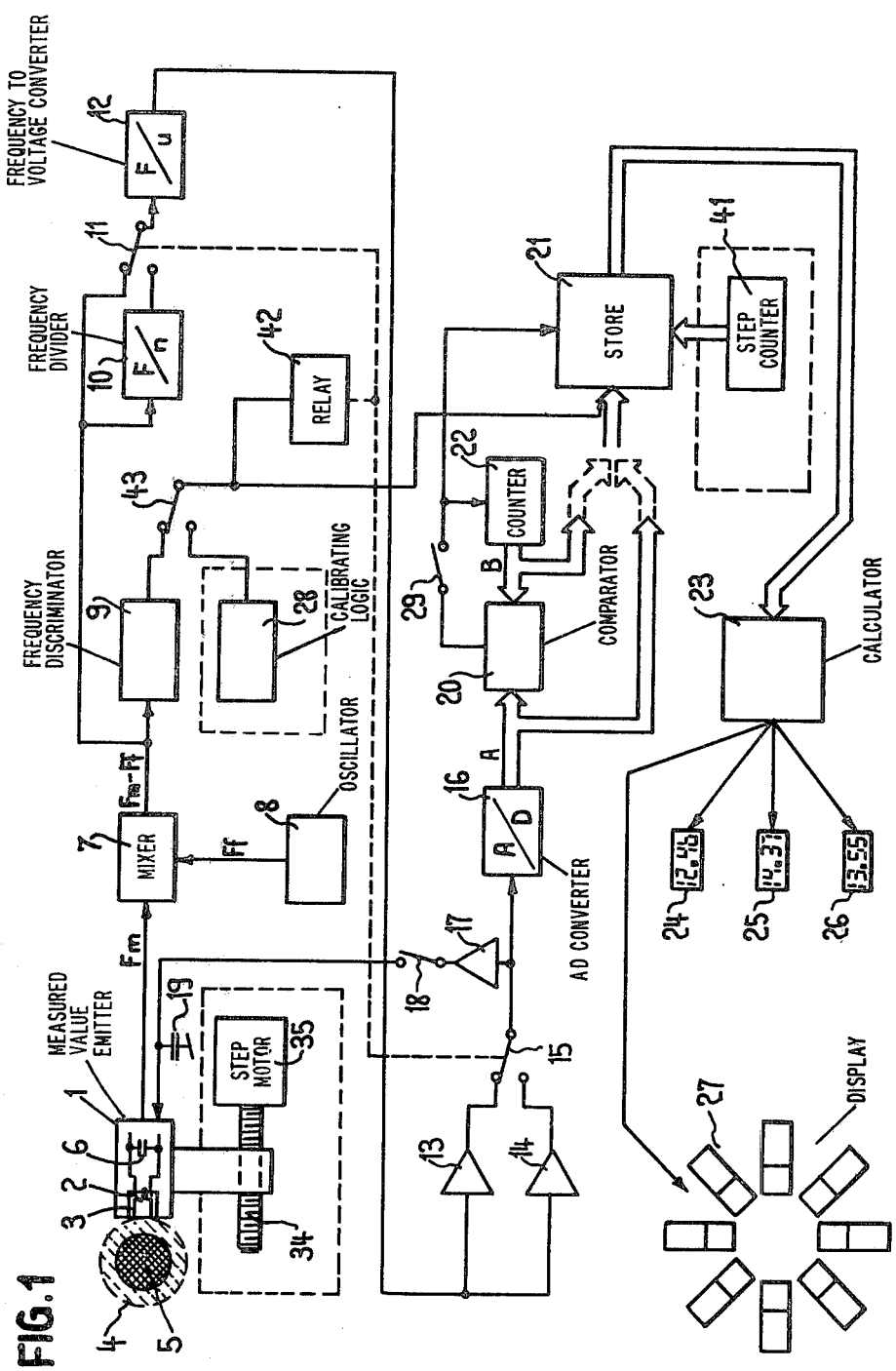
FIG. 1 is a block schematic diagram of a measuring installation for determining the insulation thickness upon cable conductors.

The measuring apparatus shown in FIG. 1 comprises a measured value emitter 1 with a measuring coil 2 on a core 3. In front of the measured value emitter 1 is arranged the cable to be examined, with insulation 4 and the cable conductor 5. The measuring coil 2 forms together with a condenser 6 the frequency determining resonant circuit of a measuring oscillator which is arranged in the measured value emitter 1 and is not further illustrated. The measuring frequency $F_m$ of the measuring oscillator passes to a mixer 7, to which a fixed frequency $F_f$ is fed from a stabilized oscillator, for example a quartz oscillator 8. The difference frequency $F_m - F_f$ is fed to a frequency discriminator 9 and a frequency divider 10 with the division ratio n. According to the position of a switch 11 the difference frequency $F_m - F_f$ or the difference frequency divided by the factor n is conducted to a frequency-voltage converter 12. The analog output signal of the converter 12 passes to two amplifiers 13 and 14, with different amplification factors of which the outputs can be selectably connected with an analog to digital converter 16 by means of the switch 15. The switches 11 and 15 are actuated by a relay 42, which via a switch 43 is selectively controllable by the frequency discriminator 9 or a calibration logic 28. The output signal of one of the amplifiers 13 and 14 can be fed to a store as a control signal via an amplifier 17 and a switch 18. The store is shown diagrammatically as a condenser 19 and influences a variable capacity (not shown) of the measuring oscillator. The circuit comprising the amplifier 17, the switch 18 and the condenser 19 serves in a manner described below for the zero adjustment of the measuring installation.

The output A of the analog to digital converter 16 is connectable with inputs of a comparator 20 and address inputs of a store 21. The other inputs of the comparator 20 are connected with a downward counter 22, of which the outputs are also connectable with the address inputs of the store 21. The outputs of the store are connected with a processor 23, outputs of which control a display 24 for absolute minimum thickness, a display 25 for absolute maximum thickness, a display 26 for the average thickness of the insulation and an analog display 27 for the shape of the insulation, as well as for the display of difference of thickness.

During the process of storage of the absolute values the calibration logic 28 is operative, and further during this process the switch 29 is closed, which connects an impulse output of the comparator 20 with control inputs of the counter 22 and the store 21. During the storage operation the measured value emitter 1 is arranged on a first slide 30 (FIG. 2) movable in the direction of the axis of the measured value emitter, which slide during movement from its position of rest to the right in FIG. 2 closes a switch 31. The slide 30 is mounted on a second slide 32, which for its part is movable in the direction of the longitudinal axis of the measured value emitter 1 upon guides 33. The slide 32 can be moved by means of a spindle 34, which is shown diagrammatically in FIG. 1, through a stepping motor 35, a defined longitudinal movement corresponding to each step of the motor. The spindle 34 is protected by a bellows 36 shown in FIG. 2. On a holder 37 of the calibration apparatus shown in FIG. 2 a standard body is arranged in a prism 38, in the case of the measurement of the layer thickness of insulation of a cable a bare cable conductor 39, of which the dimension and characteristics correspond exactly to those of the conductor of the cable to be examined. A spring, not shown, acting upon the slides 30 and 32 tends to move the slide 30 to the left in FIG. 2 towards a stop. Between the two slides 30 and 32 there is further arranged a coupling 40 which permits rigid coupling of the two slides in any mutual position. The parts belonging to the calibration apparatus and operative during the calibration process are enclosed in broken lines in FIG. 1. There is provided a step counter 41 coupled with the stepping motor 35, which presents positions as data (absolute values) to the store.

Figure 3:
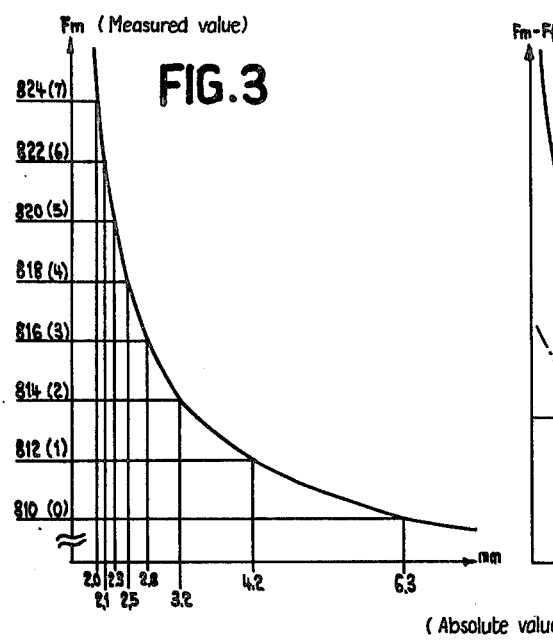
FIGS. 3 and 4 show diagrams for the explanation of the invention.

The calibration operation or storage operation will now be described with reference to FIGS. 3 and 4 which show respectively the measuring frequency Fm and the difference frequency Fm-Ff as a function of the distance of the measured value emitter from the cable conductor 5 and the standard conductor 39 respectively. It is assumed that in the usable measuring range the measuring frequency Fm amounts to between 824 and 810 kHz for the distance range from 2.00 mm to 6.30 mm of the measured value emitter from the conductor 5 or 39. This range is divided into 8 equally graduated frequencies thus yielding 8 coordinated distances of the measured value emitter from the conductor, and these frequencies yield the addresses and the distance data (absolute values), which are stored in the store 21. This produces the following table of addresses and data;

| Address | Position of the counter 22 | Data (Absolute values) |
|---|---|---|
| 824 | 7 | 2.0 |
| 822 | 6 | 2.1 |
| 820 | 5 | 2.3 |
| 818 | 4 | 2.5 |
| 816 | 3 | 2.8 |
| 814 | 2 | 3.2 |
| 812 | 1 | 4.2 |
| 810 | 0 | 6.3 |

This graduation is selected only for illustration and is naturally too coarse. Obviously the measuring region can be much more finely graduated, for example in 1024 steps. During measurement the store is now again addressed with the ascertained addresses and the coordinated data is transmitted to the processor 22, which controls the displays 24 to 27.

Before commencement of storage an adjustment is undertaken. For this purpose the measured value emitter is held at such a large distance from an object to be measured or a standard object (a position to the extreme right), that no influence results. For this condition the frequency Fm of the measuring oscillator is brought to a predetermined zero value. One may thus also refer to this as a zeroing adjustment.

Figure 2:
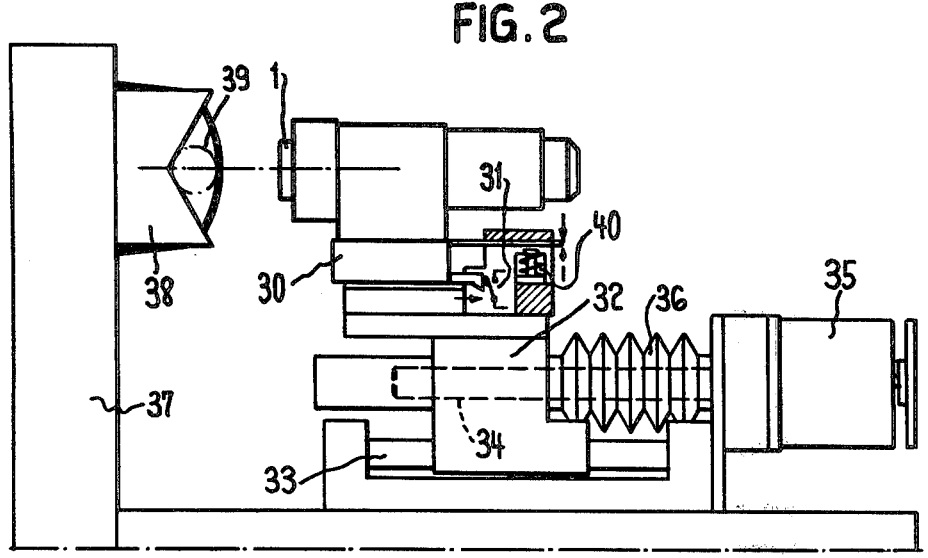
FIG. 2 shows an auxiliary device for the presentation of the absolute measured values to the store.

Both sides 30 and 32 in FIG. 2 are now simultaneously moved to the left until the measured value emitter 1 meets the standard object 39 and stops. As the slide 32 is moved further to the left, the slide 30 slides on the latter to the right until the switch 31 is closed. Now the slide 32 is again moved back to the right, until the switch 31, which comprises a certain hysteresis, just opens again. In this position the coupling 40 is now actuated and the two slides 30 and 32 are rigidly coupled. At the same time the step counter 41 is set to "0". By means of these preparatory operations the play between the spindle 34 and the slide 32 is taken up for the subsequent measurements.

The coupled slides 32 and 30 are now controlled by way of the stepping motor and thereby the measured value emitter 1 is removed stepwise from the standard object 39. The position of the stepping motor and thus the distance reached by the measured value emitter from the standard object 39 is continuously transmitted as appropriate digital information via the counter 41 to the store 21 as data (absolute quantity or magnitude). The switch 43 is placed in its lower position and the calibration logic energises the relay 42 via the same, so that the switches 11 and 15 are shifted to their lower positions. The measuring frequency Fm passes to the mixer 7 and the difference frequency Fm-Ff passes via the frequency divider 10 and the downwardly positioned switch 11 to the converter 12. The analog output signal of the converter 12 passes via the amplifier 14 with lower amplification and the downwardly positioned switch 15 to the converter 16. Also the switch 29 is closed. The output of the analog to digital converter 16 passes to the comparator 20 and the downward counter 22 is set to a value which lies somewhat below the output value of the converter 16 at the beginning of calibration. As soon as a value now appears at the output of the analog to digital converter 16 which lies just under the set starting value of the counter 22, the comparator 20 transmits an impulse to the counter 22 and the store 21 via the switch 29. The distance of the measuring head from the conductor is available in the counter 41 in the form of the number of steps of the stepping motor. The condition of the counter 41 (data) is stored at the address which corresponds to the measured distance. The downward counter is set to a step below, and as soon as the information at the output of the analog to digital converter 16 again sinks below the information at the output of the downward counter, a new impulse passes to the store 21 and the downward counter 22.

In this manner all addresses and data in the whole of the relevant measuring range are taken account of. As shown in FIG. 4 there is elaborated as a result of the frequency division and the low amplification in the amplifier 14 a curve I which is shown in dot and dashed lines and which is developed more shallowly than the curve 0 which corresponds to the difference frequency Fm-Ff. The region in which a storage generally occurs is defined by boundary values which in FIG. 4 are given by the abscissa and the line G. For the part of the curve in this region, storage takes place in a first region of the store 21 likewise indicated with the reference I. The region I of the store is thereby defined through the information passing from the calibration logic via the switch 43 to the store.

Figure 4:
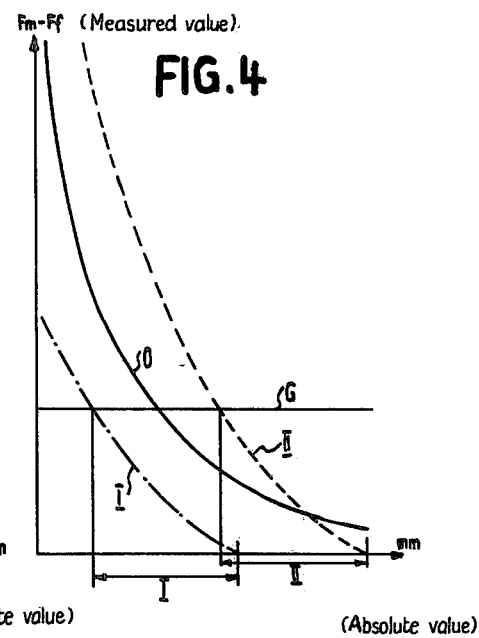

After the storage of the region I effected in this manner, which corresponds with the section of the curve between the abscissa and the line G in FIG. 4, the storage in the whole region is carried out with other conditions. The calibration logic during this operation switches the relay 42 so that the switches 11 and 15 return into the illustrated rest positions. The difference frequency Fm-Ff now passes directly to the input of the frequency to voltage converter 12 and the output signal of this converter is amplified in the amplifier 13 which comprises a higher amplification factor than the amplifier 14. The signal passing from the calibration logic to the store via the switch 43 activates a second storage region II, to which corresponds, according to FIG. 4 a calibration curve II which is developed more steeply in contrast to the curve of the difference frequency and is shown in FIG. 4 in broken lines. As described above, during the movement of the measured value emitter 1 back from the standard object 39 storage is now again effected in the store 21, only in an operative region lying between the abscissa and the line G in FIG. 4. The storage regions overlap somewhat at their boundaries, i.e. the measured values and positions of the measured value emitter lying in these regions are stored in both parts I and II of the store and can be read therefrom selectively.

In order to carry out measurement the measured value emitter 1 according to FIG. 1 is brought up to the cable 4, 5 to be examined. The distance of the measured value emitter from the conductive 5 of the cable corresponds to the thickness of the cable insulation 4. The frequency Fm of the measuring oscillator also corresponds to this distance. The above mentioned zero adjustment is carried out with the uninfluenced measured value emitter as necessary before the measurement. For the measurement, the switch 43 is then shifted into the illustrated position and the switch 29 is opened. The relay 42 and the region of the store are accordingly now controlled from the frequency discriminator 9 and the comparator 20 is ineffective. During the measurement the frequency discriminator 9 determines whether the difference frequency Fm-Ff corresponds to the region I or II. When small insulation thicknesses are to be measured and thus region I is concerned, the frequency discriminator delivers a corresponding information which energises the relay 42 and shifts the switches 11 and 15 so that measurement is carried out with limited sensitivity. The region I of the store is effective. The output information of the analog to digital converter 16 which corresponds to the measurement passes to the address inputs of the store and the coordinate data is transferred from the output of the store to the processor 23 which controls the displays 24 to 27. If during the measurement the region II is reached which relates to greater insulation thicknesses, the frequency discriminator 9 by the emission of corresponding information deenergises relay 42 so that the switches 11 and 15 take up the illustrated positions, and the store is switched over to the region II. Owing to the fact that the regions I and II overlap it is not necessary that the frequency discriminator should switch over at an exactly defined frequency; it can comprise a certain hysteresis, so that for example the switching over during transition from region I to region II may occur at the lower end of region I, while the switching over from region II to region I is effected at the upper end of region II.

From the above it may be seen that the illustrated installation allows a linearisation of measurement and therewith an absolute measurement. A calibration through storage of data is only necessary once. During later measurements at most only a fresh zero adjustment is necessary. The division of the whole measurement region into partial regions with different measuring sensitivity enables storage in the whole measuring region with almost the same steps and thereby enables substantially the same power of resolution to be obtained over the whole measuring region with optimal use of the store. A division into more than two measuring regions can also be made.

The invention is not limited to the illustrated use. The wall thicknesses of pipes can also be measured, in which case a conductive body is arranged in the pipe and acts upon the measured value emitter 1. Insulation thicknesses on sheet metal can also be determined.

An essential advantage of the absolute measurement of layer thicknesses consists in that, for example during the production of insulated cable or synthetic tubes one can at any time determine directly the sectional layer thickness and thus the consumption of material and immediately undertake possible corrections. To complete the process described above the measured value emitter for the determination of layer thickness is moved stepwise to several positions, for example eight positions around the circumference of the cable or pipe, and the measurements are stored and displayed as provided for by the display 24 to 27 according to FIG. 1.

I claim:

1. A process for the measurement of absolute values by means of a non-linearly working measured value emitter, comprising the steps of:
    carrying out a calibration process wherein for a predetermined number of measured values differing from each other and emitted by said measured value emitter the corresponding absolute values are determined by an accurate auxiliary method and stored each in a store at one of a number of addresses coordinated to the said measured values;
    carrying out a measuring process to obtain by means of said measured value emitter corresponding measured values;
    interrogating said store by means of address information derived from said measured values; and
    reading from addresses of the store located with said address information the corresponding absolute values stored therein.

2. A process for the measurement of absolute values by means of a non-linearly working measured value emitter, comprising the steps of:
    carrying out a calibration process comprising the steps of bringing the measured value emitter into a plurality of predetermined positions, and storing information derived from the position of the measured value emitter in a store at addresses determined by the respective measured values emitted by said emitter;
    carrying out a measuring process to obtain by means of said measured value emitter corresponding measured values;
    interrogating said store by means of address information derived from said measured values; and
    reading from addresses of the store located with said address information the corresponding absolute values stored therein.

3. A process according to claim 2, wherein the absolute values are stored digitally.

4. A process according to claim 2, wherein the measured value emitter is brought consecutively into different positions by means of a stepping motor, and the step count is stored as the absolute value.

5. A process according to claim 2, wherein during said calibration process the determination of said absolute values is carried out with a different graduation in each of a plurality of respective measuring regions.

6. A process according to claim 5, wherein the said measuring regions being selected to overlap one another.

7. A process according to claim 2, wherein the measured value emitter is adjusted before each of the calibration and the measuring operations.

8. A process according to claim 7, wherein the said measuring process comprises an inductive measuring process for the definition of distances from inaccessible objects.

9. A measuring apparatus for the measurement of absolute values by means of a non-linearly working measured value emitter, comprising a measured value emitter; auxiliary calibrating means for obtaining absolute values corresponding to a number of different measured values emitted by said emitter; a store; means for automatically storing each of said absolute values in said store at one of a number of addresses coordinated each to one of said emitted measured values; and means for interrogating said stores with address information derived from measured values delivered thereto from said emitter during measurement.

10. A measuring apparatus comprising a measured value emitter, means for obtaining absolute values corresponding to measured values emitted by said emitter, storing means, said storing means comprising a counter which is advanceable by equal steps and a comparator for comparing the output information of said counter with output information from the measured value emitter, address input means of said store, the output of said counter being connected to the address input means of the store, and the comparator being arranged to provide write impulses to said store, said absolute values being introduced as data into said store at addresses coordinated to said emitted measured values upon receipt of said write impulses, and means for interrogating said store with address information derived from measured values delivered thereto from said emitter.

11. Apparatus according to claim 10, wherein said store is a digital store.

12. Apparatus according to claim 10, wherein the store is selectively addressable by the output of the counter or by information derived from the measured value emitter.

13. A measuring apparatus comprising a measured value emitter, store means, means for storing absolute values as data in said store at addresses coordinated to said emitted measured values, said absolute value obtaining means comprising a carrier for said measured values emitter, means for shifting said carrier and measured values emitter respectively by equal steps for locating said measured value emitter at a predetermined distance from a standard object, means for emitting absolute value information corresponding to the said distance and position of said carrier respectively, such absolute values being stored by said means for storing them in said store means, and means for interrogating said store with address information derived from measured values delivered thereto from said emitter.

14. Apparatus according to claim 13, wherein said locating means comprises a stepping motor for shifting said carrier for the measured value emitter, and said absolute value emitting means comprises a step counter connected with the data input of the store.

15. Apparatus according to claim 14, wherein a first carrier supporting the measured value emitter is slidably arranged upon a second carrier slidably movable by the spindle of the stepping motor, and is biased by means of a spring acting between the carriers for the engagement of the measured value emitter against the standard object; and a coupling is provided for the rigid connection of the two carriers.

16. Apparatus according to claim 14, comprising a zero adjustment circuit for the measured value emitter.

17. Apparatus according to claim 13, wherein said measured value emitter includes a measuring oscillator of which the measuring frequency depends upon the measured value, and said storing means comprises means for converting the measuring frequency into a digital quantity for the addressing of the store.

18. Apparatus according to claim 17, wherein the output of the measuring oscillator is connected to a frequency/voltage converter and the output of the latter is connected to an analog to digital converter.

19. Apparatus according to claim 18, wherein a selectively switchable frequency divider is located in front of the frequency to voltage converter.

20. Apparatus according to claim 18, including different amplifiers which are selectively switchable into a circuit for the amplification of the measured value.

21. Apparatus according to claim 13, wherein the store has several storage regions, the selection of which can be effected by a calibration logic of said absolute value obtaining means, and by a measured value discriminator of said interrogating means.

22. Apparatus according to claim 21, wherein the said measured value emitter includes a measuring oscillator of which the frequency of oscillation depends on the measured value and said discriminator is a frequency discriminator.

23. Apparatus according to claim 21, wherein the arrangement is such that the measuring sensitivity is selectably switchable together with the storage region.

24. A process for the measurement of absolute values by means of a non-linearly working measured value emitter, comprising the steps of:
carrying out a calibration process wherein said emitter is successively exposed to a plurality of measuring conditions each of such conditions being simultaneously measured by an accurate auxiliary measuring method for determining the absolute value of the quantity being measured, and storing each of said absolute values in a store at one of a number of addresses associated with the said measured values,
carrying out a measuring process to obtain by means of said measured value emitter corresponding measured values, interrogating said store by means of address information derived from said measured values and reading from addresses of the store located with said address information the corresponding absolute values stored therein.

* * * * *